Dec. 9, 1947.  A. C. AVRIL  2,432,368
HAND TRUCK
Filed Oct. 17, 1945
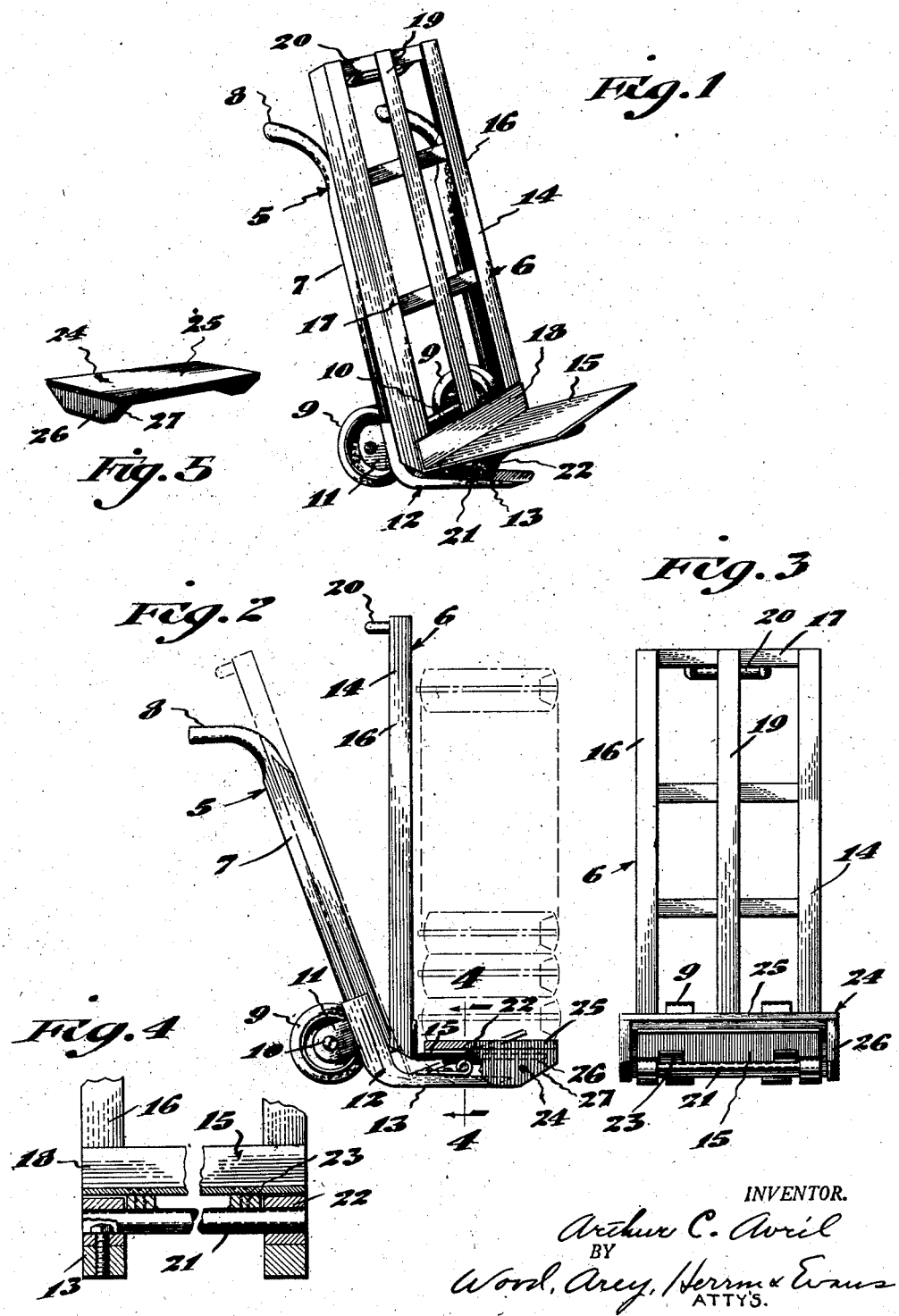
INVENTOR.
Arthur C. Avril
BY
Wood, Arey, Herrm & Evans
ATTY'S.

Patented Dec. 9, 1947

2,432,368

UNITED STATES PATENT OFFICE 2,432,368

HAND TRUCK

Arthur C. Avril, Cincinnati, Ohio

Application October 17, 1945, Serial No. 622,778

2 Claims. (Cl. 214—65.4)

This invention relates to improvements in hand trucks of the type used for handling and moving merchandise in and about factories, warehouses, etc. The improvements in this particular case have resulted because of the problems of handling sacks of cement. The invention which has resulted, however, is not thus limited in its usage, but is of value in the handling of any merchandise which may be stacked when in storage or at the points of supply or use.

It has been the object of the present inventor to provide a hand truck which includes pick up means conveniently operable for loading a relatively high stack of merchandise onto the truck with a minimum of effort.

Further, it has been an added object of the inventor to provide a device of this character usable in conjunction with a dolly or skid upon which the stacks of merchandise may be stored.

With these improvements, the truck may be moved up to the stack of merchandise, positioned with respect to it, and thereupon by an easy pulling motion on the pick up means, the stack may be drawn back into loaded position on the hand truck, moved to its destination and there unloaded by reversing these same simple movements. In order to achieve ease of operation and to decrease the amount of effort required, the pivotal arrangement of the parts and the leverages have been carefully calculated.

Other objects and certain advantages of the invention will be more fully apparent from the description of the drawings, in which:

Figure 1 is a perspective view of the hand truck of this invention showing the pick up or cradle means in retracted or loaded position.

Figure 2 is a side view of the truck illustrating the pick up means in loading position with respect to the dolly, or skid, and being shown in dot and dash lines in retracted carrying position against the truck frame.

Figure 3 is a front view of the truck.

Figure 4 is a sectional view taken on line 4—4 (Figure 2) illustrating the details of the pivotal mounting of the pick up unit on the base of the truck.

Figure 5 is a perspective view of the dolly, or skid.

The main frame of the truck is generally indicated at 5 and the pick up unit at 6. The main frame of the truck includes side or handle bars 7 having formed handles 8 at their upper ends. Appropriate cross pieces (not shown) are provided for the truck body. The truck is mounted on wheels 9—9 mounted on the shaft 10, the shaft being secured or mounted in a pair of wheel brackets 11—11. The lower end of truck incorporates angular nose pieces 12, one extending forwardly from each side bar. These pieces constitute the base upon which the truck rests and also the support for the pick up means. Thus, when the truck is in position of rest, that is, when it is not being used to transport merchandise, the forward legs 13 of the angular pieces rest flush on the floor immediately in front of the wheels (Figure 2).

The pick up unit 6 is in the form of a cradle. Generally speaking, it is pivoted on the nose pieces 12—12. It includes a back section 14 which is higher than the handle bars of the truck, and a base or support plate 15 disposed forwardly at right angles to the back section 14.

The back section 14 is made up of angle iron side rails 16 secured in laterally spaced position and cross members 17 at the top and at intermediate positions. The lower ends of the side rails are joined by the attaching flange 18 of the base plate 15. The central strip 19 further strengthens the structure. A handle 20 projects rearwardly at the extreme upper end of the back section and is of a form readily grasped by the operator for pulling the unit and its load backwardly onto the body of the truck.

The mounting of the pick up unit is by means of a cross shaft 21 journalled in bearings 22 mounted on the nose piece 12. The bearings include flanges bolted to the horizontal extensions 13 of the nose piece. The base of the plate 15 includes pads 23 welded to its underside. The shaft 21 is welded to these pads. The pads lie adjacent to and engage the inner sides of the bearings 22 so as to prevent lateral shifting of the pick up unit. The side rails of the pick up unit have their side flanges disposed rearwardly so that these angular pieces rest over the handle bars (Figure 1).

The sacks of cement are placed on dollies 24 which may be made of wood or any other suitable material. These dollies include base members 25 and legs or side pieces 26. The legs of the dollies are so spaced that the base of the pick up unit may be inserted between them underneath the base member as indicated in Figure 2. The dolly, or skid, is beveled at the front and rear edges of the sides as indicated at 27. It is constructed in this manner so as to clear the corners. If the bevel were not provided, the stack would have a tendency to lift up directly, rather than tilt with the cradle, for a short distance before falling back into position of rest in the cradle. This would interfere greatly with the handling and storing of the material in neat stacks.

The pivot point for the cradle or pick up unit is located so as to require very little leverage for tipping the stack of sacks into a position of rest or transportation on the truck. The positions selected for the pivot are such that the load will rest inclined against the truck body when the truck is left in normal position, as shown in Figure 2, with the nose of the truck engaging the floor. As the cradle unit is moved forwardly about half-way between reclining position and normal storage position, that is, with the stacks in vertical relationship, the stack will overbalance forwardly with a very slight movement. In other words, the point of balance is somewhere intermediate of the two positions. In moving the truck for transporting the merchandise, the upper end of the truck is lowered to a comfortable pushing and carrying position in which attitude there is no chance of the stack falling forwardly. This use of the truck is not practical for bags or sacks of cement or the like but is satisfactory for handling rigid containers or cartons.

By swinging the pick up unit forwardly beyond a position where the back is vertical, the forward edge of the plate 15 will be brought substantially in contact with the ground or floor level. Thus, at this time the plate may be readily inserted under a stack of merchandise supported directly on the floor; that is, without the use of the dolly.

Having described my invention, I claim:

1. A hand truck having a truck body in combination with a loading unit, said truck body consisting of a frame having wheels at its lower end and forwardly projected nose pieces, said loading unit consisting of a back rest and a base support plate extended forwardly on right angles from the back rest, said loading unit pivotally mounted on the nose pieces in position to swing as a unit relative to the truck body with a load substantially in equilibrium thereon and adapted to engage under a stack of merchandise and a handle on the upper end of the back rest for pulling the loading unit and the stack of merchandise back into reclining support position on the truck body.

2. A hand truck comprising a wheeled truck body adapted to stand normally in a vertical position and having handles at its upper end and wheels at its lower end, members projecting from its lower end forwardly, an L-shaped pick up unit pivotally mounted on said members, said pick-up unit adapted to swing relative to the truck body with a load substantially in equilibrium thereon, the lower portion constituting a pick up extension insertable beneath the stack of merchandise to be transported and the vertical portion constituting a back rest for the stack of merchandise and adapted to be drawn back into position of recline against the body of the truck.

ARTHUR C. AVRIL.

REFERENCES CITED

The following references are of record in the file of this patent:

UNITED STATES PATENTS

| Number | Name | Date |
| --- | --- | --- |
| 679,621 | Hulburd | July 20, 1910 |
| 1,308,934 | Chesnutt | July 8, 1919 |
| 1,425,999 | Morrow | Aug. 15, 1922 |
| 1,653,927 | Pryor | Dec. 27, 1927 |
| 1,795,826 | Bowen | Mar. 10, 1931 |
| 1,803,058 | Fontaine | Apr. 28, 1931 |
| 2,030,925 | Lea | Feb. 18, 1936 |
| 2,118,711 | McKinney | May 24, 1938 |
| 2,329,439 | Hanssen | Sept. 14, 1943 |
| 2,338,645 | James | Jan. 4, 1944 |